(12) United States Patent
Benedetti et al.

(10) Patent No.: US 6,877,295 B1
(45) Date of Patent: Apr. 12, 2005

(54) METHOD OF PRODUCING SEALED PACKAGES CONTAINING POURABLE FOOD PRODUCTS FROM A TUBE OF PACKING MATERIAL, AND PACKING UNIT IMPLEMENTING SUCH A METHOD

(75) Inventors: Paolo Benedetti, Modena (IT); Hans Selberg, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/806,935

(22) PCT Filed: Oct. 6, 1999

(86) PCT No.: PCT/EP99/07505

§ 371 (c)(1),
(2), (4) Date: Apr. 6, 2001

(87) PCT Pub. No.: WO00/20279

PCT Pub. Date: Apr. 13, 2000

(30) Foreign Application Priority Data

Oct. 7, 1998 (EP) .............................................. 98830588

(51) Int. Cl.⁷ .............................. B65B 9/06; B65B 51/22
(52) U.S. Cl. .............................. 53/451; 53/479; 53/552; 53/374.6
(58) Field of Search ........................ 53/451, 479, 547, 53/552, 373.7, 374.2, 374.3, 374.5, 374.6

(56) References Cited

U.S. PATENT DOCUMENTS

| 3,195,285 A | * | 7/1965 | Toss ............................. 53/479 |
| 3,538,676 A | * | 11/1970 | Runo et al. ................... 53/552 |
| 3,874,976 A | * | 4/1975 | MacFarland, Jr. ............. 53/552 |
| 4,106,261 A | * | 8/1978 | Greenawalt .................. 53/450 |
| 4,109,792 A | * | 8/1978 | Greenawalt et al. ........ 53/374.5 |
| 4,350,003 A | * | 9/1982 | Greenawalt et al. .......... 53/548 |
| 4,512,138 A | * | 4/1985 | Greenawalt ................... 53/451 |
| 4,606,174 A | | 8/1986 | Berg |
| 4,608,810 A | | 9/1986 | Bordini |
| 4,617,779 A | | 10/1986 | Nygren et al. |
| 4,637,199 A | * | 1/1987 | Steck et al. ................... 53/451 |
| 4,646,507 A | | 3/1987 | Ohlsson et al. |
| 4,661,486 A | | 4/1987 | Takeshiba et al. |
| 4,731,250 A | | 3/1988 | Stark |
| 4,731,978 A | | 3/1988 | Martensson |
| 5,284,002 A | * | 2/1994 | Fowler et al. ................. 53/451 |
| 5,531,060 A | | 7/1996 | Fayet et al. |
| 5,564,255 A | | 10/1996 | Giacomelli |
| 5,673,534 A | * | 10/1997 | Fowler ......................... 53/552 |
| 5,713,186 A | * | 2/1998 | Bruhn .......................... 53/451 |
| 5,755,076 A | * | 5/1998 | Otsuka ....................... 53/373.7 |
| 6,044,628 A | * | 4/2000 | Katayama et al. ............. 53/552 |

FOREIGN PATENT DOCUMENTS

| EP | 0460540 A1 | * | 12/1991 | ............. B65B/9/12 |
| EP | 0887269 A1 | * | 12/1998 | ............. B65B/9/12 |

* cited by examiner

*Primary Examiner*—Stephen F. Gerrity
(74) *Attorney, Agent, or Firm*—Burns, Doane, Swecker & Mathis, L.L.P.

(57) ABSTRACT

A method and apparatus for producing sealed packages containing pourable food products from a tube of heat seal sheet packing material fed along a vertical path and filled continuously with the food product. The tube is pressure gripped at equally spaced cross sections of the tube by at least two pairs of jaws acting cyclically and successively on the tube. The tube is cut at each of the cross sections along a respective parting line. The packing material of the tube is heated sealed on opposite sides of the parting line.

13 Claims, 6 Drawing Sheets

METHOD OF PRODUCING SEALED PACKAGES CONTAINING POURABLE FOOD PRODUCTS FROM A TUBE OF PACKING MATERIAL, AND PACKING UNIT IMPLEMENTING SUCH A METHOD

TECHNICAL FIELD

The present invention relates to a method of producing sealed packages containing pourable food products from a tube of packing material, and a packing unit implementing such a method.

BACKGROUND ART

Many pourable food products, such as fruit juice, pasteurized or UHT (ultra-high-temperature treated) milk, wine, tomato sauce, etc., are sold in packages made of sterilized packing material.

A typical example of such a package is the parallelepiped packing container for liquid or pourable food products known by the name of Tetra Brik Aseptic (registered trademark), which is formed by folding and sealing a strip-rolled packing material. The rolled packing material comprises layers of fibrous material, e.g. paper, covered on both sides with heat seal plastic material, e.g. polyethylene.

For aseptic packing of long-storage products, such as UHT milk, the packing material comprises a layer of barrier material, e.g. an aluminium sheet, which is superimposed on the layer of heat seal plastic material and is in turn covered with another layer of heat seal plastic material forming the inner face of the package actually contacting the food product.

As is known, packages of the above type are produced on fully automatic packing machines, on which a continuous tube is formed from the packing material supplied in strip form. The strip of packing material is sterilized on the packing machine, e.g. by applying a chemical sterilizing agent, such as a hydrogen peroxide solution; following sterilization, the sterilizing agent is removed, e.g. vaporized by heating, from the surfaces of the packing material; and the strip of packing material so sterilized is kept in a closed sterile environment, and is folded and sealed longitudinally to form a tube.

The tube is filled with the sterilized or sterile-processed food product, and is gripped at equally spaced cross sections by two pairs of jaws, which operate cyclically and successively on the tube to heat seal the packing material of the tube and form a continuous strip of pillow packs connected to one another by respective transverse sealing bands.

The pillow packs are separated by cutting the respective sealing bands, and are transferred to a final folding station where they are folded mechanically into the final parallelepiped shape.

Packing units of the above type are known in which the reciprocating movement of the jaws is controlled by a cam system comprising an electric motor, the output shaft of which is fitted, for each pair of jaws, with two cams with appropriately differing profiles. By means of respective lever mechanisms, the cams control the up and down movement of a supporting slide to which a respective pair of jaws is hinged, and the reciprocating opening and closing movement of the jaws.

Two facing forming tabs are hinged respectively to the jaws in each pair, and are moved between an open position, into which they are pushed by elastic means, and a closed position in which they mate to define a space defining the shape and volume of the package to be formed in between. The forming tabs are closed by cams fixed to the structure of the unit, and which interact with respective rollers carried by the tabs.

The portion of the tube gripped between each pair of jaws is simultaneously heat sealed transversely by induction heating means on the jaws.

More specifically, one of the jaws in each pair comprises a main body made of nonconducting material, and an inductor housed in a front seat on the main body. The inductor is normally supplied by a high-frequency generator, and comprises a bar made of electrically conducting material and which interacts with the tube material to heat it to the required sealing temperature.

The other jaw in each pair comprises pressure pads made of elastic material and which cooperate with the inductor to heat seal the tube along a respective sealing band.

Once the sealing operation is completed, a knife on one of the jaws in the pair interacting with the tube of packing material is activated to cut the tube along the center of the sealing band and so detach a pillow pack from the bottom end of the tube of packing material. As the bottom end is sealed transversely, the jaws, on reaching the bottom dead center position, can be opened to prevent interfering with the upper portion of the tube. At the same time, the other pair of jaws, operating in exactly the same way, moves down from the top dead center position to repeat the above gripping/forming, sealing and cutting operations.

As stated, the tube of packing material is heat sealed by inducing electric loss current in the aluminium sheet, which current melts the plastic heat seal material locally when the respective pair of jaws grips the tube, so as to seal a cross section of the tube by heat sealing the plastic coating.

From analysis of the packing material during the heat seal operation, the loss current induced in the cross section of the tube of packing material gripped between each pair of jaws has been found to follow a closed path, which is linear along the two longitudinal sides of the region in which the inductor interacts with the tube, and is roughly semicircular close to the edges of the cross section. That is, the current flows linearly in opposite directions along the two longitudinal sides of the region in which the inductor interacts with the tube, and is deflected towards the center of the cross section gripped between the jaws close to the edges of the cross section ("bending-off effect"), so that the sealing band is narrower at the ends than at the central portion. On the other hand, when packing pourable food products containing small solid particles, such as seeds in tomato products, which may get trapped between the nonsealed portions of the two contacting sheets of packing material, the sealing band should be as wide as possible to reduce the likelihood of channels forming through the sealed portion.

DISCLOSURE OF INVENTION

It is an object of the present invention to provide a method of producing sealed pourable food product packages from a tube of packing material, designed to eliminate the aforementioned drawbacks typically associated with known methods.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figures 1, 8:
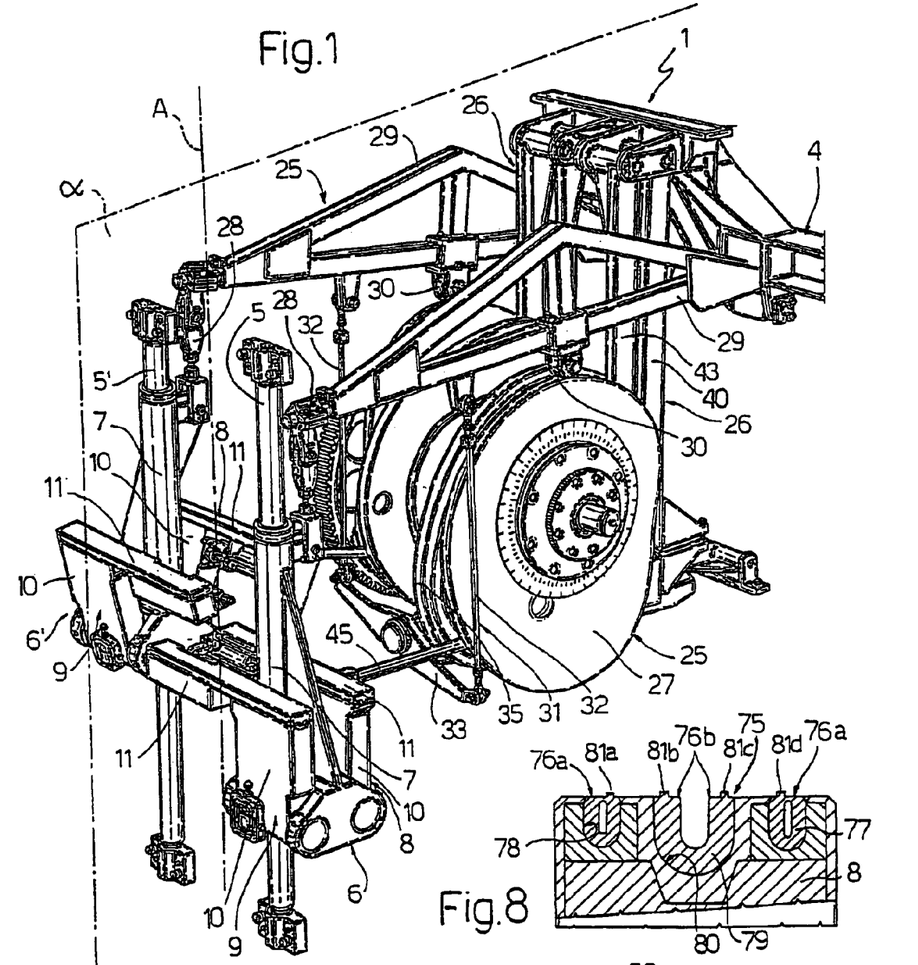
FIG. 1 shows a view in perspective, with parts removed for clarity, of a packing unit for producing aseptic sealed packages containing pourable food products from a tube of packing material and according to the method of the present invention.
FIG. 8 shows a larger-scale section of a variation of the FIG. 7 induction heating element.
Figure 2:
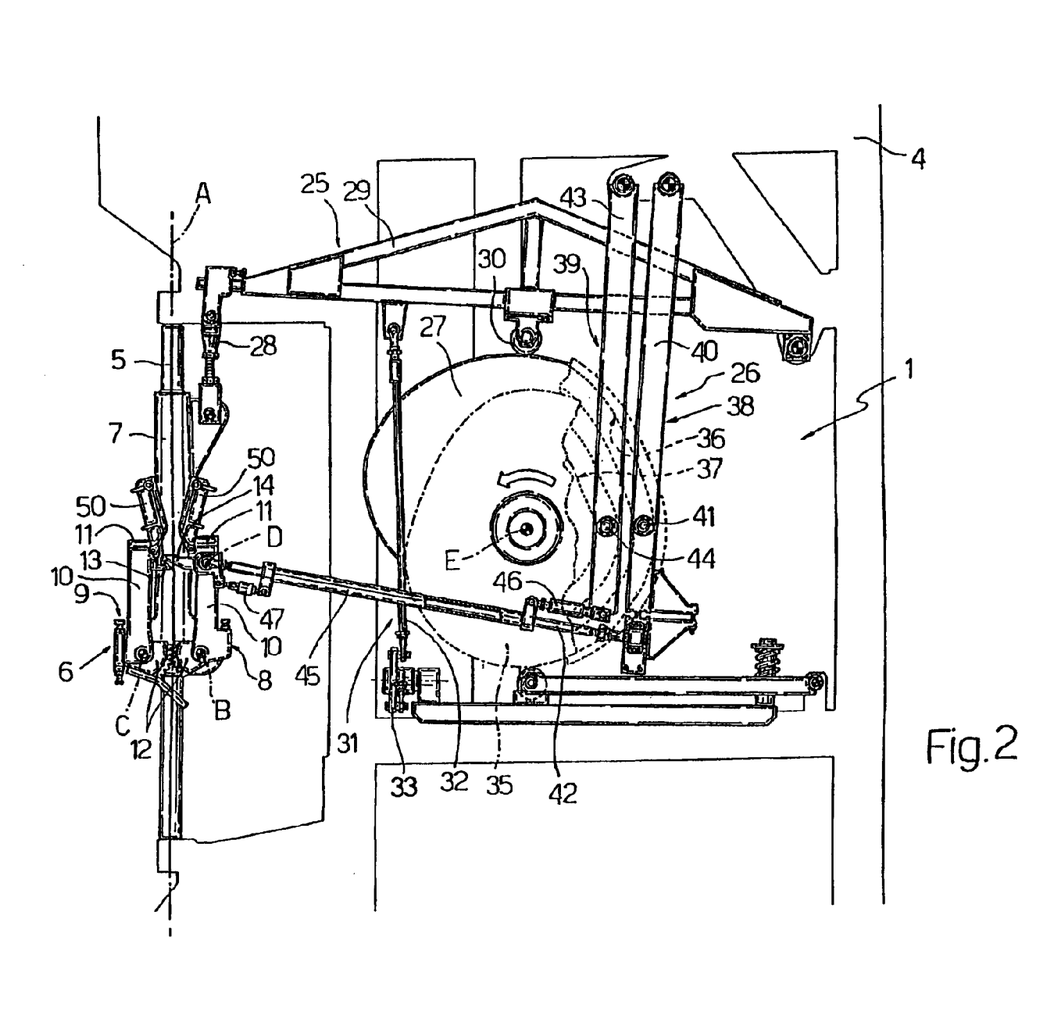
FIG. 2 shows a side view, with parts removed for clarity, of the FIG. 1 unit.
Figure 3:
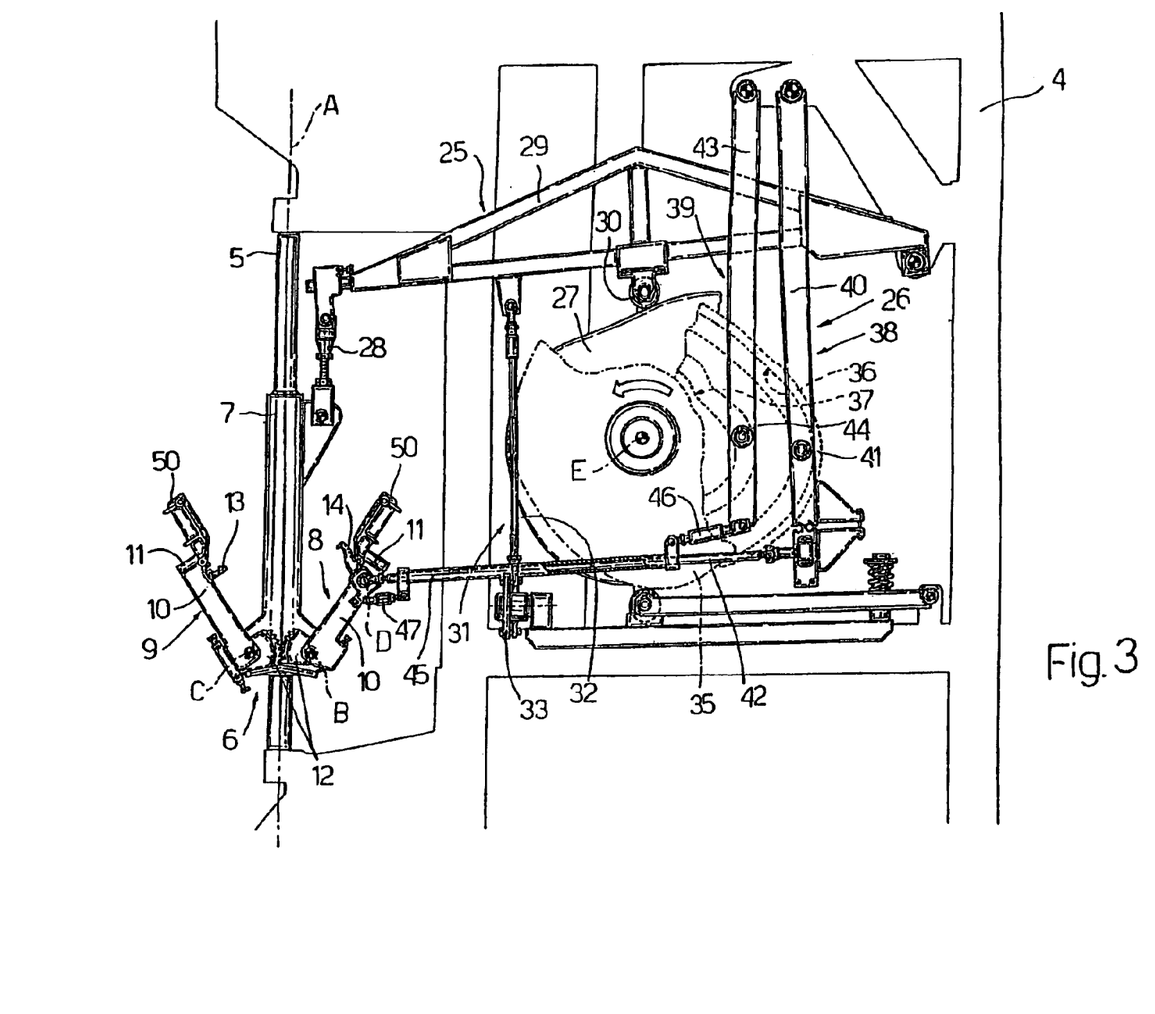
FIG. 3 shows a side view of the FIG. 2 unit in a different operating configuration.

Number 1 in FIGS. 1 to 3 indicates as a whole a packing unit for producing, from a tube 3 of packing material, aseptic sealed packages 2 (FIGS. 4 to 6) containing a pourable food product, such as pasteurized or UHT milk, fruit juice, wine, etc.

The packing material has a multilayer structure (not shown), and comprises a layer of fibrous material, normally paper, covered on both sides with respective layers of heat seal plastic material, e.g. polyethylene. The side of the packing material eventually contacting the food product in package 2 also comprises a layer of electrically conductive barrier material, e.g. aluminium, in turn covered with one or more layers of heat seal plastic material.

Tube 3 is formed in known manner upstream from unit 1 by longitudinally folding and sealing a strip of heat seal strip material, is filled with the sterilized or sterile-processed food product for packaging, and is fed by known devices (not shown) along a vertical path defined by an axis A.

Unit 1 comprises a supporting structure 4 defining a pair of cylindrical vertical guides 5, 5' located symmetrically with respect to the longitudinal vertical mid-plane α of unit 1 through axis A (FIG. 1).

With reference to FIGS. 1 to 6, unit 1 comprises in known manner a pair of forming assemblies 6, 6' movable vertically along respective guides 5, 5' and which interact cyclically and successively with tube 3 of packing material to grip equally spaced cross sections of the tube and perform cutting and heat seal operations on tube 3 as described in detail later on.

As assemblies 6, 6' are known and symmetrical with respect to plane α, only one (assembly 6) will be described, and only as regards the parts pertinent to the present invention. The corresponding parts of assemblies 6, 6' are indicated in the drawings using the same numbering system.

Assembly 6 substantially comprises a slide 7 movable along respective guide 5; and a pair of jaws 8, 9 defined, in the example shown, by substantially L-shaped plates, which are hinged at the bottom to slide 7 about respective horizontal axes B, C perpendicular to plane α, and are movable between a closed position (FIGS. 2, 4, 5) and a fully-open position (FIG. 3).

More specifically, each jaw 8, 9 comprises a substantially quadrangular base portion 10 hinged at the bottom end to a bottom portion of slide 7; and an arm 11 for interacting with tube 3, and which is fixed to the top end of portion 10 and projects from portion 10 in a direction perpendicular to plane α. Arms 11 of jaws 8, 9 extend towards and beyond plane α on opposite sides of tube 3.

At respective portions 10, jaws 8, 9 comprise respective integral transmission members 12 in the form of sector gears, which mesh with each other so that the rotation of one of jaws 8, 9 about respective axis B, C is transmitted in the opposite direction to the other jaw 8, 9.

Assembly 6 also comprises a first hook element 13 integral with portion 10 of one (9) of the jaws; a second hook element 14 hinged to portion 10 of the other jaw (8) about an axis D parallel to axes B, C; and a hydraulic cylinder 15 for engaging hook elements 13 and 14 tightly in an engaged position corresponding to the closed position of jaws 8, 9 about tube 3.

Figure 4:
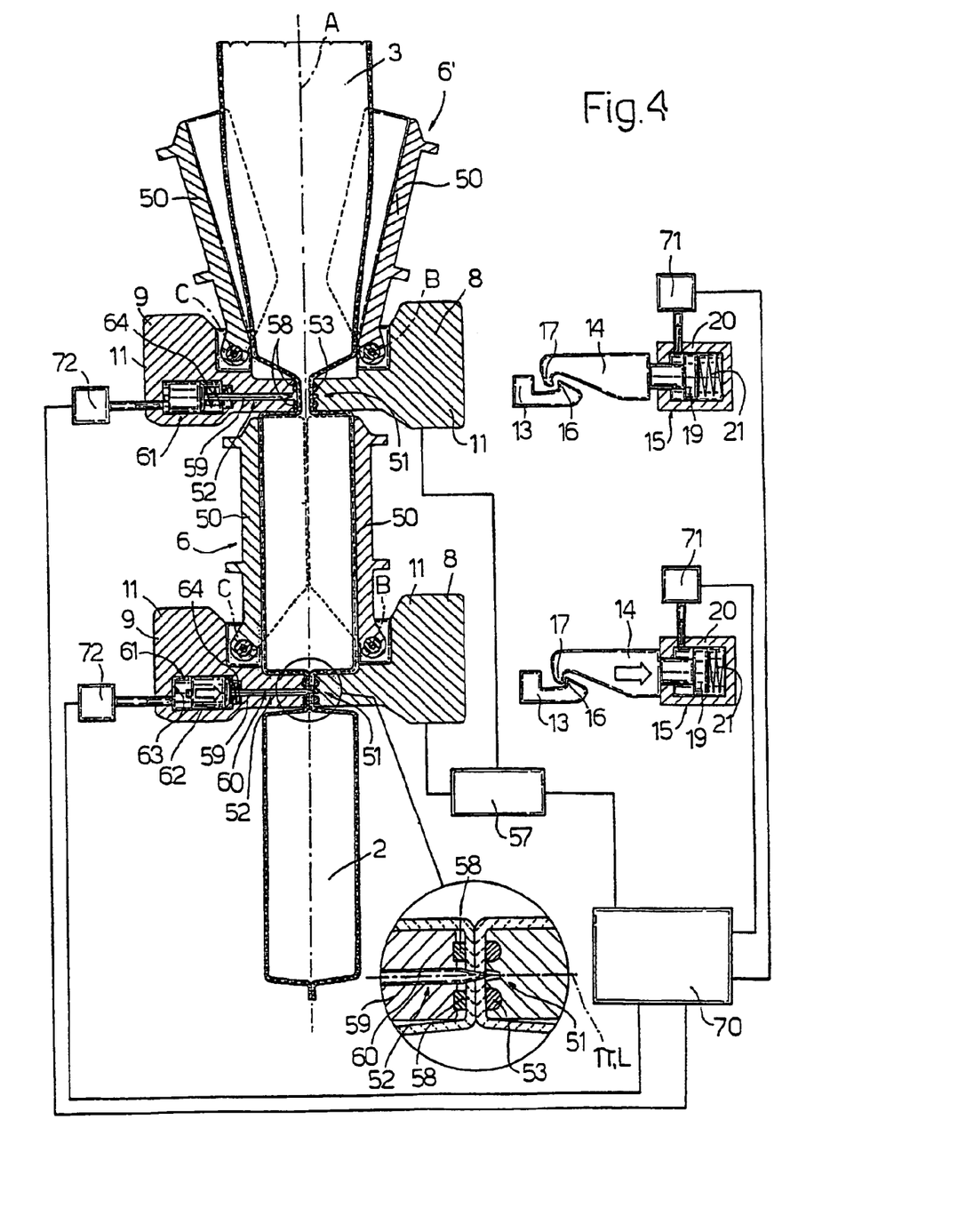
FIGS. 4 to 6 show larger-scale side views of two forming assemblies of the FIG. 1 unit at various stages in the processing of the tube of packing material.
Figure 5:
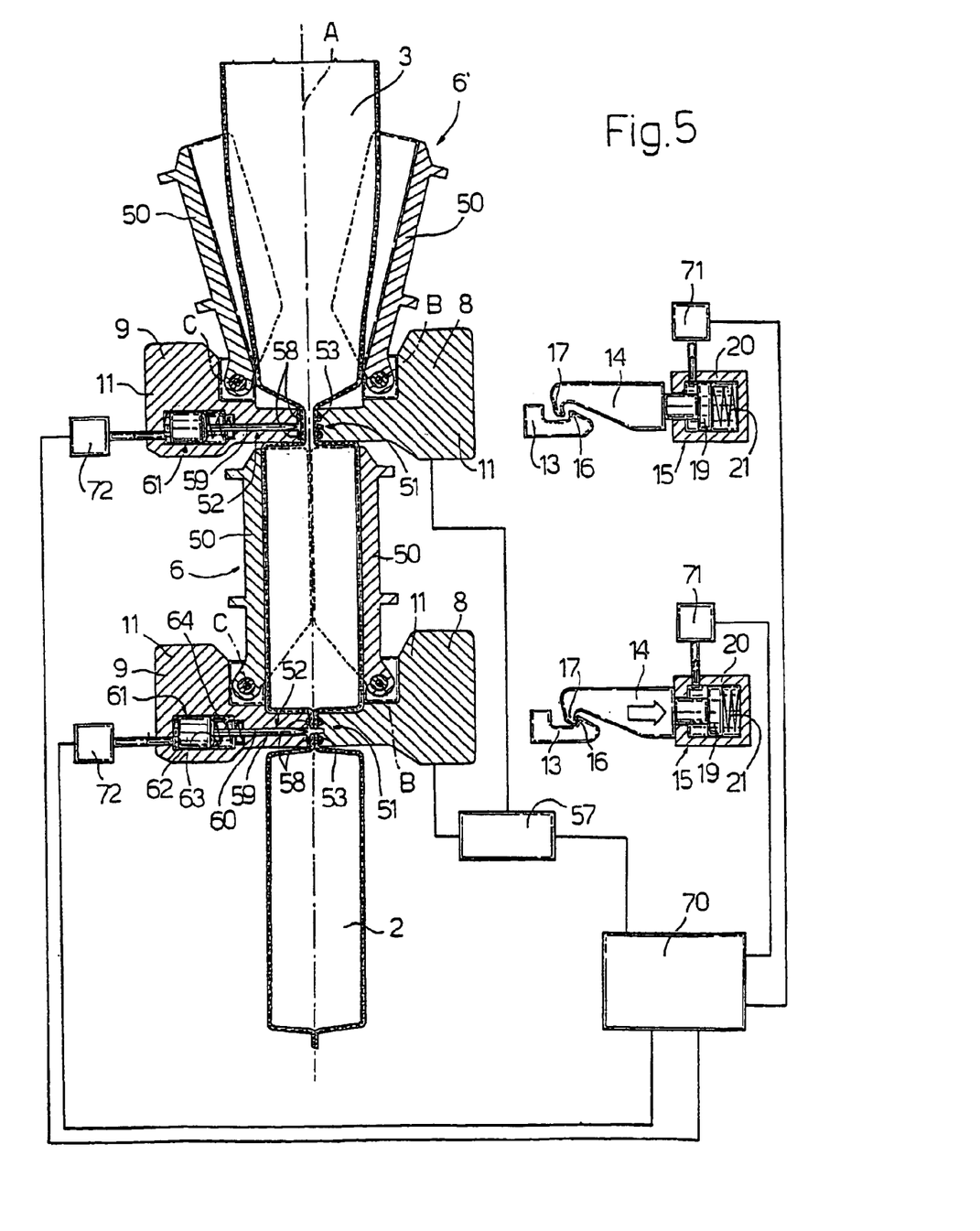

More specifically, hook elements 13 and 14 are mutually engaged by means of respective teeth 16 and 17. Cylinder 15 comprises a piston 19 extending integrally from hook element 14 at the opposite end to hook element 13, and which slides in sealed manner inside an outer jacket 20 and is normally pushed towards hook element 13 by a spring 21 housed inside jacket 20, so that, when disconnecting hook elements 13 and 14, a minimum clearance is maintained between and to disengage teeth 16 and 17 (FIGS. 4 and 5 relative to assembly 6'). When oil under pressure is fed into jacket 20 through an inlet in cylinder 15, spring 21 is compressed to engage teeth 16 and 17 tightly (FIGS. 4 and 5 relative to assembly 6, and FIG. 6 relative to assembly 6').

Jaws 8, 9 are therefore movable vertically by slide 7 moving along guide 5, and also perform an opening and closing movement about tube 3 of packing material by rotating about respective hinge axes B, C between the jaws and slide 7. The opening and closing movement is superimposed on the up and down vertical movement of slide 7.

The vertical movement and the opening and closing movement are controlled respectively by a first and second known cam actuating device 25, 26.

With reference to FIGS. 1 to 3, actuating device 25 comprises a cam 27 rotating about a respective axis E parallel to axes B, C, D; a substantially vertical lever 28 hinged at the bottom to a top portion of slide 7; and a substantially horizontal rocker arm lever 29, which is located over cam 27, is hinged at opposite ends to lever 28 and to structure 4, and cooperates with the outer profile of cam 27 by means of a respective intermediate idle roller 30.

Rocker arm levers 29 of assemblies 6, 6' are also connected to each other and to structure 4 by a lever mechanism 31, so that rollers 30 of rocker arm levers 29 are kept contacting respective cams 27 at all times. Lever mechanism 31 comprises a pair of substantially vertical rods 32 hinged at the top to respective rocker arm levers 29, and at the bottom to a transverse lever 33 in turn hinged centrally to structure 4 about an axis perpendicular to axes A, B, C, D. More specifically, each rod 32 is hinged to respective rocker arm lever 29 in an intermediate position between respective roller 30 and respective lever 28.

Actuating device 26 comprises a cam 35 having an axis E and defining, on the outer face, a first and second annular groove 36, 37 having appropriately differing profiles, and which, by means of respective lever mechanisms 38, 39, respectively control the rotation of jaws 8, 9 about axes B, C and the engagement and release movement of teeth 16 and 17 of hook elements 13 and 14.

More specifically, lever mechanism 38 comprises a substantially vertical first rod 40 hinged at the top end to structure 4 and supporting a projecting idle roller 41 engaging in rolling manner groove 36 of cam 35; and a second rod 42 extending parallel to plane α and crosswise to axis A, and hinged at opposite ends to jaw 8 about axis D, and to the bottom end of rod 40.

Lever mechanism 39 comprises a substantially vertical first rod 43 hinged at the top end to structure 4 and supporting a projecting idle roller 44 engaging in rolling manner groove 37 of cam 35; and a tubular second rod 45 fitted in axially-sliding manner on rod 42 and hinged at opposite ends, by means of respective connecting rods 46, 47, to the bottom end of rod 43 and to hook element 14, at a point below axis D.

Since, as stated previously, the vertical movement of slide 7 and the opening and closing movement of jaws 8, 9 are superimposed, lever 28 moves reciprocatingly, while rods 42 and 45 perform a periodic movement resulting from the combination of the reciprocating movement of lever 28 and a further component of periodic motion for opening and closing jaws 8, 9.

With reference to FIGS. 2 to 6, assembly 6 also comprises two mutually facing forming tabs 50 hinged to respective jaws 8, 9 and movable between an open position (FIG. 2), into which they are pushed by elastic means (not shown), and a closed position (FIGS. 4 and 5) in which they mate to define a space defining the shape and volume of the package 2 to be formed in between. Tabs 50 are closed by known cams (not shown) fixed to structure 4 of unit 1, and which interact with respective rollers (not shown) on tabs 50.

With reference to FIGS. 4 to 7, assembly 6 also comprises a sealing device 51 and a cutting device 52, which, for each cross section of tube 3 of packing material gripped between respective jaws 8 and 9, provide respectively for heat sealing the cross section and cutting along a respective middle parting line L.

Figure 7:
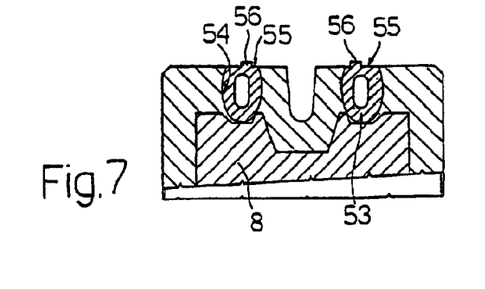
FIG. 7 shows a larger-scale section of an induction heating element of the FIG. 4-6 forming assemblies.

With reference to FIGS. 4 and 7 in particular, device 51 comprises a substantially U-shaped induction heating element 53 housed in a similarly shaped front groove 54 formed in arm 11 of jaw 8.

Heating element 53 has a substantially ring-shaped cross section; an inner cavity for the passage of coolant; and a pair of straight, elongated active surfaces 55, which interact with tube 3 and extend on opposite sides of and parallel to an intermediate plane π perpendicular to axis A and coinciding, in use, with parting line L of the cross section of tube 3 gripped between jaws 8 and 9.

Heating element 53 also comprises a pair of straight longitudinal projections 56 projecting from respective active surfaces 55 towards jaw 9, extending substantially the whole length of active surfaces 55, and which, during heat sealing, provide for increasing the gripping pressure on tube 3.

Figure 6:
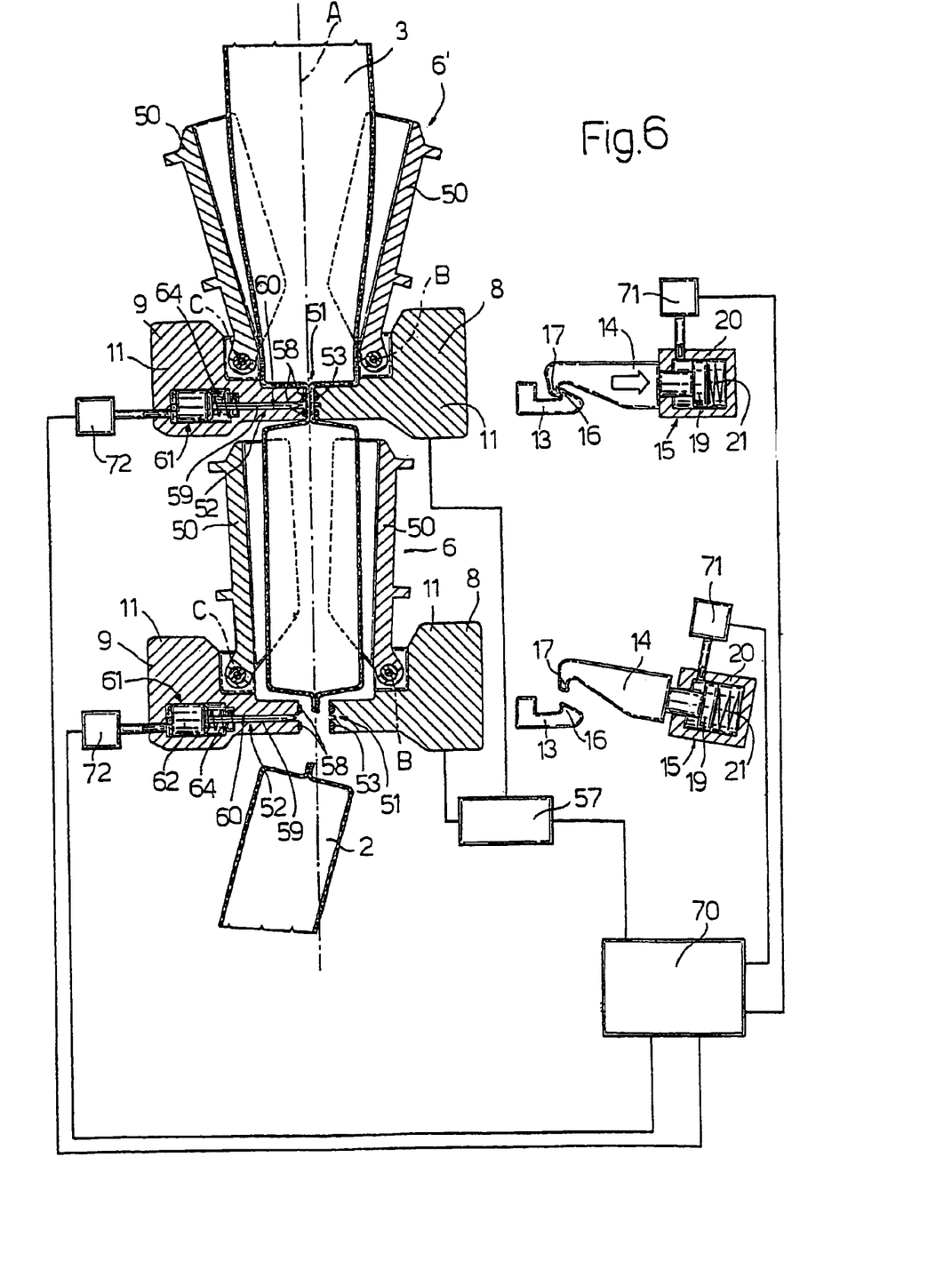

Heating element 53 is supplied in known manner by an electric current generator 57 shown schematically in FIGS. 4 to 6.

Device 51 also comprises a pair of pressure pads 58 (FIG. 4), which are normally made of elastic material, are fitted to the front of jaw 9, and cooperate with respective active surfaces 55 of heating element 53 to grip and heat seal tube 3 on opposite sides of plane π.

With reference to FIGS. 4 to 6, device 52 comprises a substantially flat cutting element 59 housed in sliding manner in a front seat 60 on jaw 9 and movable in a direction perpendicular to plane α; and a hydraulic cylinder 61 for activating cutting element 59 and built into jaw 9.

More specifically, cylinder 61 comprises a piston 62 integral with cutting element 59 and movable inside a chamber 63 formed in the body of jaw 9 and communicating on one side with seat 60 and on the opposite side with a pressurized oil inlet. Cutting element 59 is normally maintained in a withdrawn idle position, fully housed inside seat 60 (FIGS. 5 and 6), by a spring 64 housed inside chamber 63 and interposed between piston 62 and a wall separating chamber 63 from seat 60, and is moved by pressurized oil into a forward cutting position (FIG. 4) projecting frontwards from jaw 9 and cooperating with a cavity in jaw 8.

Unit 1 also comprises a central control unit 70 (FIGS. 4 to 6) connected to generator 57 and to cylinders 15, 61 via the interposition of respective known solenoid valves 71, 72 shown schematically with no indication of the supply, discharge or drive ports.

According to the present invention, central control unit 70 provides, when tube 3 is gripped by each pair of jaws 8, 9, for controlling respective generator 57 and the control cylinder 61 of respective cutting element 59 according to a predetermined program memorized in unit 70 itself, so as to first cut the cross section of tube 3 gripped between jaws 8 and 9 along the parting line L, and then heat seal the packing material of tube 3 on opposite sides of parting line L.

Operation of unit 1, which is partly self-explanatory from the above description, is as follows.

As each assembly 6, 6' travels downwards, jaws 8 and 9 of assembly 6, 6' move into the closed position to grip tube 3 with a downward vertical component of motion equal to the traveling speed of tube 3. As they travel downwards, jaws 8 and 9 are kept closed and grip tube 3 tightly by central control unit 70 activating cylinder 15, and in particular by the movement of piston 19 engaging teeth 16 and 17 of hook elements 13 and 14 and so gripping jaws 8 and 9.

At this stage, central control unit 70 activates cylinder 61 to move cutting element 59 from the withdrawn to the forward position to cut the cross section of tube 3 of packing material gripped between jaws 8 and 9 along parting line L (FIG. 4).

Once cylinder 61 is deactivated, and hence cutting element 59 restored to the withdrawn position by spring 64, central control unit 70 activates generator 57 to supply electric current to heating element 53 and so heat seal tube 3 of packing material on opposite sides of parting line L (FIG. 5).

During this stage, heating element 53 melts the plastic heat seal layer of the packing material locally; and the electric current supply to heating element 53 is cut off while maximum pressure is still being exerted by jaws 8 and 9 on tube 3, so that cooling and consequent setting, on which the seal depends, of the plastic layer commence under pressure to ensure perfect sealing of packages 2.

Close to the bottom dead center position, central control unit 70 deactivates cylinder 15 to release hook elements 13 and 14 and so open jaws 8 and 9—which are opened fully as they travel upwards—and release tube 3 (FIG. 6).

The movement of assemblies 6, 6' is obviously offset by half a cycle: assembly 6 with jaws 8, 9 open traveled upwards at the same time assembly 6' with jaws 8, 9 closed travels downwards, so that arms 11 of assembly 6' pass between arms 11 of assembly 6 with no interference.

Inverting the cutting and heat sealing of tube 3 of packing material as compared with the known methods described previously alters the path of the loss currents induced in the packing material by heating element 53.

That is, as parting line L formed by cutting element 59 in tube 3 of packing material produces an interruption in the electric continuity of the aluminium sheet, the electric loss currents induced in the packing material by the two active surfaces 55 of heating element 53 are confined on opposite sides of parting line L. In other words, the electric loss current induced in the packing material by one of active surfaces 55 of heating element 53 on one side of parting line L tends to move towards the other active surface 55 of heating element 53, but, on account of the interruption produced in the packing material, is forced to close its path on the same side of parting line L.

As a result, the sealing area on both sides of parting line L is more or less constant, by eliminating the bending-off effect of the electric loss current close to the edges of the cross section gripped between jaws 8 and 9.

The FIG. 8 variation relates to an induction heating element 75 similar to heating element 53, but comprising two straight active surfaces 76a, 76b in lieu of each active surface 55.

More specifically, heating element 75 comprises a substantially U-shaped first body 77, which is housed in a similarly shaped front groove 78 formed in arm 11 of jaw 8, has a substantially ring-shaped cross section, and defines, externally, two active surfaces 76a on opposite sides of plane π.

Heating element 75 also comprises a second body 79, which is defined by a straight bar having a U-shaped cross section and housed in an intermediate recess 80 in jaw 8, and defines two active surfaces 76b on opposite sides of midplane π and interposed between active surfaces 76a.

Like heating element 53, heating element 75 comprises four straight longitudinal projections ala, 81b, 81c, 81d projecting towards jaw 9 from respective active surfaces 76a, 76b.

Using heating element 75, the electric loss current induced in the packing material has been found to follow substantially symmetrical closed paths on opposite sides of parting line L. More specifically, on each side of parting line L, the electric loss current travels linearly along each active surface 76a, 76b of heating element 75, with only a minimum amount of deflection close to the edges of the packing material, and which, involving only a very small part of the sealing region, is practically negligible. The method according to the present invention has been found by the Applicant to produce sealed pourable food product packages 2 in which the full height of the transverse sealing region is completely sealed.

As stated above, in known techniques, two contiguous packages are usually sealed transversely along two parallel lines before being separated along line L.

The Applicant, on the other hand, has found it more advantageous to separate the packages unsealed and simply compressed between the sealing and elastic contrasting elements, which provides for expelling the small amount of product compressed between the two projections, and so bringing the two layers of heat seal material even closer together to improve the seal.

Using heating element 53 with two active surfaces 55, the two edges cut by cutting element 59 but still close together may possibly be traversed by currents in opposite directions, thus resulting in short circuiting—also aided by the presence of the usually conductive product—with the surrounding metal masses, and in less than perfectly reliable operation of the packing unit.

Using heating element 75 with four active surfaces 76a, 76b, on the other hand, the problem is eliminated entirely, by the whole of the central conductor (76b, 79) being at the same potential, and by the cutting element 59 penetrating along a line of symmetry of the currents with no possibility of affecting the amplitude or direction of the currents, thus enabling the product to be expelled and improving both sealing and the reliability of the packing unit itself.

Tests conducted by the Applicant have also shown that using heating element 75 with four active surfaces 76a, 76b and at least two projections 81a, 81b, 81c, 81d provides for greatly reducing product leakage from tube 3 of packing material cut prior to heat sealing. Projections 81, 81b, 81c, 81d may be either continuous or segmented.

Clearly, changes may be made to unit 1 as described herein without, however, departing from the scope of the accompanying claims.

Though particularly advantageous for sealing packing material by induction of electric current, the method described also applies to other sealing processes.

What is claimed is:

1. A method of producing sealed packages containing pourable food products from a tube of heat seal sheet packing material fed along a vertical path and filled continuously with said food product; said method comprising the steps of:

pressure gripping equally spaced cross sections of said tube by means of at least two pairs of jaws acting cyclically and successively on the tube;

cutting said tube, at each of said cross sections, along a respective parting line; and then heat sealing the packing material of said tube on opposite sides of said parting line, wherein the cutting operation is performed before the sealing operation while the tube is continuously filled with said food product.

2. A method of producing sealed packages containing pourable food products from a tube of heat seal sheet packing material fed along a vertical path and filled continuously with said food product; said method comprising the steps of:

pressure gripping equally spaced cross sections of said tube by means of at least two pairs of jaws acting cyclically and successively on the tube;

cutting said tube, at each of said cross sections, along a respective parting line; and heat sealing the packing material of said tube on opposite sides of said parting line;

wherein said heat seal step is performed by inducing, on opposite sides of said parting line of said tube of packing material, electric loss currents traveling along substantially symmetrical paths with respect to the parting line.

3. A method of producing aseptic sealed packages containing pourable food products from a tube of heat seal sheet packing material comprising at least one layer of electrically conductive barrier material fed along a vertical path and filled continuously with said food product; said method comprising the steps of:

pressure gripping equally spaced cross sections of said tube by means of at least two pairs of jaws acting cyclically and successively on the tube;

cutting said tube, at each of said cross sections, along a respective parting line; and then heat sealing the packing material of said tube on opposite sides of said parting line, wherein said heat seal step is performed by inducing electric loss current in said packing material of said tube.

4. A packing unit for producing sealed packages containing pourable food products from a tube of heat seal sheet packing material fed along a vertical path and filled continuously with said food product, said unit comprising a fixed structure; at least two pairs of jaws movable with respect to said structure and acting cyclically and successively on said tube to pressure grip equally spaced cross sections of the tube; and sealing means and cutting means carried by each said pair of jaws to respectively perform, on each said cross section of said tube of packing material gripped between the jaws, a heat seal operation and a cutting operation along a respective parting line;

comprising control means for controlling said jaws, said sealing means and said cutting means to perform, on said tube of packing material, first said cutting operation along said parting line and then said heat seal operation on opposite sides of the parting line; and wherein the cutting operation is performed before the sealing operation while the tube is continuously filled with said food product.

5. A unit as claimed in claim 4, wherein said cutting means comprise at least one cutting element carried by one of said jaws in each pair and movable, with respect to the jaws, crosswise to said tube of packing material; and first actuating means for moving said cutting element between an idle position, and a cutting position in which the cutting element projects frontwards from the respective said jaw.

6. A packing unit for producing sealed packages containing pourable food products from a tube of heat seal sheet packing material fed along a vertical path and filled continuously with said food product, said unit comprising a fixed structure; at least two pairs of jaws movable with respect to said structure and acting cyclically and successively on said tube to pressure grip equally spaced cross sections of the tube; and sealing means and cutting means carried by each said pair of jaws to respectively perform, on each said cross section of said tube of packing material gripped between the jaws, a heat seal operation and a cutting operation along a respective parting line; wherein said sealing means comprise heating means in turn comprising, for each pair of said jaws, at least two elongated active surfaces interacting with each said cross section of said tube gripped between the jaws, and located on opposite sides of the respective said parting line; and wherein the cutting operation is performed before the sealing operation while the tube is continuously filled with said food product.

7. A packing unit for producing aseptic sealed packages containing pourable food products from a tube of heat seal sheet packing material comprising at least one layer of electrically conductive barrier material fed along a vertical path and filled continuously with said food product, said unit comprising a fixed structure; at least two pairs of jaws movable with respect to said structure and acting cyclically and successively on said tube to pressure grip equally spaced cross sections of the tube; and sealing means and cutting means carried by each said pair of jaws to respectively perform, on each said cross section of said tube of packing material gripped between the jaws, a heat seal operation and a cutting operation along a respective parting line;

comprising control means for controlling said jaws, said sealing means and said cutting means to perform, on said tube of packing material, first said cutting operation along said parting line and then said heat seal operation on opposite sides of the parting line, wherein said sealing means comprise electric-current-induction heating means carried by one of said jaws in each pair; contrasting means carried by the other of said jaws in said pair and cooperating with said heating means; and electric current generating means for supplying said heating means.

8. A unit as claimed in claim 7, wherein said layer of electrically conductive material of said packing material is made of aluminum.

9. A unit as claimed in claim 7, wherein said heating means comprise, for each pair of said jaws, at least two elongated active surfaces interacting with each said cross section of said tube gripped between the jaws, and located on opposite sides of the respective said parting line.

10. A unit as claimed in claim 9, wherein said heating means comprise, for each pair of said jaws, four elongated said active surfaces interacting with each said cross section of said tube gripped between the jaws, and located in pairs on opposite sides of the respective said parting line; said active surfaces inducing, on opposite sides of said parting line of each said cross section of said tube of packing material, electric loss currents traveling along substantially symmetrical paths with respect to the parting line.

11. A unit as claimed in claim 9, wherein said heating means comprise, for each said active surface, a projection projecting frontwards from the active surface and extending substantially the whole length of the active surface.

12. A packing unit for producing sealed packages containing pourable food products from a tube of heat seal sheet packing material fed along a vertical path and filled continuously with said food product, said unit comprising a fixed structure; at least two pairs of jaws movable with respect to said structure and acting cyclically and successively on said tube to pressure grip equally spaced cross sections of the tube; and sealing means and cutting means carried by each said pair of jaws to respectively perform, on each said cross section of said tube of packing material gripped between the jaws, a heat seal operation and a cutting operation along a respective parting line;

comprising control means for controlling said jaws, said sealing means and said cutting means to perform, on said tube of packing material, first said cutting operation along said parting line and then said heat seal operation on opposite sides of the parting line, wherein said cutting means comprise at least one cutting element carried by one of said jaws in each pair and movable, with respect to the jaws, crosswise to said tube of packing material; and first actuating means for moving said cutting element between an idle position, and a cutting position in which the cutting element projects frontwards from the respective said jaw and comprising first and second hook means carried by respective said jaws in each pair; and second actuating means for pressure engaging said first and second hook means in an engaged position corresponding to a closed position of the jaws on said tube of packing material.

13. A unit as claimed in claim 12, wherein said control means comprise a central control unit connected to said first and second actuating means and to an electric current generator.

* * * * *